US008821765B2

(12) United States Patent
Sugiura et al.

(10) Patent No.: US 8,821,765 B2
(45) Date of Patent: Sep. 2, 2014

(54) CATHODE ACTIVE MATERIAL FOR LITHIUM SECONDARY BATTERY

(75) Inventors: Ryuta Sugiura, Nagoya (JP); Akira Urakawa, Nagoya (JP); Nobuyuki Kobayashi, Nagoya (JP); Tsutomu Nanataki, Toyoake (JP)

(73) Assignee: NGK Insulators, Ltd., Nagoya (JP)

( * ) Notice: Subject to any disclaimer, the term of this patent is extended or adjusted under 35 U.S.C. 154(b) by 570 days.

(21) Appl. No.: 13/198,366

(22) Filed: Aug. 4, 2011

(65) Prior Publication Data

US 2012/0049109 A1 Mar. 1, 2012

Related U.S. Application Data

(60) Provisional application No. 61/378,521, filed on Aug. 31, 2010.

(51) Int. Cl.
*H01B 1/08* (2006.01)
*H01M 4/525* (2010.01)
*H01M 4/505* (2010.01)

(52) U.S. Cl.
USPC .................................... 252/518.1; 252/521.2

(58) Field of Classification Search
CPC ............ H01B 1/08; H01M 4/06; H01M 4/08; H01M 4/525; H01M 4/505; H01M 4/667; H01M 2004/021; B32B 2307/202; C23C 16/0254; C01P 2006/16
USPC ............. 252/518.1, 521.2; 429/218.1, 231.1, 429/231.9
See application file for complete search history.

(56) References Cited

U.S. PATENT DOCUMENTS

| | | | | |
|---|---|---|---|---|
| 5,631,400 | A | 5/1997 | Beshouri et al. | |
| 7,217,406 | B2 | 5/2007 | Tsukuma et al. | |
| 2013/0344391 | A1 * | 12/2013 | Yushin et al. | 429/231.8 |

FOREIGN PATENT DOCUMENTS

| | | | |
|---|---|---|---|
| JP | 05-226004 | A1 | 9/1993 |
| JP | 2002-075365 | A1 | 3/2002 |
| JP | 2004-083388 | A1 | 3/2004 |
| JP | 2005-158401 | A1 | 6/2005 |
| JP | 2009-117241 | A1 | 5/2009 |
| JP | 2009-259605 | A1 | 11/2009 |

OTHER PUBLICATIONS

Fukasawa et al "Synthesis of porous ceramics with complex pore structure by freeze-dry process", J. Am. Chem. Soc. 84(1) 230-232 (2001).*

* cited by examiner

*Primary Examiner* — Mark Kopec
(74) *Attorney, Agent, or Firm* — Burr & Brown, PLLC

(57) ABSTRACT

The present invention provides a cathode active material for a lithium secondary battery containing therein an open pore having a protrusion which is formed so as to extend from the inner surface of the open pore toward the center of the open pore. Specifically, the protrusion is formed so as to extend toward the center of a virtual circle formed by approximating the shape of a cross section of the open pore to a circular shape. The protrusion is formed of the same material as the remaining portion of the cathode active material.

4 Claims, 5 Drawing Sheets

CATHODE ACTIVE MATERIAL FOR LITHIUM SECONDARY BATTERY

BACKGROUND OF THE INVENTION

1. Field of the Invention

The present invention relates to a cathode active material for a lithium secondary battery (may be referred to as a "lithium ion secondary battery").

2. Description of the Related Art

Widely known cathode active materials for lithium secondary batteries include those employing a lithium composite oxide (lithium transition metal oxide) (see, for example, Japanese Patent Application Laid-Open (kokai) No. H05-226004). There has also been known a cathode active material of this type in which voids (may be referred to as "vacancies" or "pores") are formed for improving rate characteristic or cycle characteristic (see, for example, Japanese Patent Application Laid-Open (kokai) Nos. 2002-75365, 2004-083388, and 2009-117241).

SUMMARY OF THE INVENTION

The present invention has been accomplished in order to provide a cathode active material of this type exhibiting improved characteristics as compared with such conventional cathode active materials.

The present invention provides a cathode active material for a lithium secondary battery (hereinafter may be referred to simply as "cathode active material") containing therein an open pore having a protrusion which is formed so as to extend from the inner surface of the open pore toward the center of the open pore. Specifically, the protrusion is formed so as to extend from the inner surface of the open pore toward the center of a virtual circle formed by approximating the shape of a cross section of the open pore to a circular shape. The protrusion is formed of the same material as the remaining portion of the cathode active material.

The cathode active material of the present invention is formed of a lithium composite oxide, and typically has a layered rock salt structure or a spinel structure.

As used herein, the term "layered rock salt structure" refers to a crystal structure in which lithium layers and layers of a transition metal other than lithium are arranged in alternating layers with an oxygen layer therebetween; i.e., a crystal structure in which transition metal ion layers and lithium layers are arranged in alternating layers via oxide ions (typically, $\alpha$-$NaFeO_2$ type structure: cubic rock salt type structure in which transition metal and lithium are arrayed orderly in the direction of the [111] axis). As used herein, the term "lithium composite oxide" refers to an oxide represented by $Li_xMO_2$ ($0.05<x<1.10$, M is at least one transition metal (typically, M includes one or more species of Co, Ni, and Mn)).

The cathode active material of the present invention may be formed so as to have a voidage of 3 to 30% and an open pore ratio of 70% or more.

As used herein, the term "voidage" refers to the volume proportion of voids (pores: including open pores and closed pores) in the cathode active material of the present invention. "Voidage" may also be referred to as "porosity." "Voidage" is calculated from, for example, bulk density and true density.

As used herein, the term "open pore ratio" refers to the ratio by volume of open pores to all the voids (pores) contained in the cathode active material of the present invention. As used herein, the term "open pore" refers to a pore which is contained in the cathode active material of the present invention and which communicates with the outside of the cathode active material. "Open pore ratio" may be determined by, for example, impregnating a sample with a resin under reduced pressure, observing a cross section of the sample under a scanning electron microscope, and calculating the ratio by area of resin-impregnated pores (open pores) to all the pores. Alternatively, "open pore ratio" may be calculated from the total number of open pores and closed pores determined by bulk density, and the number of closed pores determined by apparent density. In this case, parameters used for calculation of "open pore ratio" may be determined through, for example, Archimedes' method.

The cathode active material of the present invention may be produced in the form of "particles" or "self-standing film." As used herein, the term "self-standing film" refers to a film which can be handled by itself after formation. When the cathode active material of the present invention is in a "particle" form, the cathode active material particles may be produced so as to have a particle size of 5 μm or more and less than 100 μm. When the cathode active material particles of the present invention are in a "plate-like" form, the cathode active material plate-like particles may be produced so as to have a thickness of 5 μm or more and less than 200 μm. Alternatively, when the cathode active material of the present invention is in a "self-standing film" form, the cathode active material film may be produced so as to have a thickness of 5 μm or more and less than 200 μm.

In the cathode active material of the present invention having such a structure, stress generated by crystal lattice expansion/contraction associated with intercalation and deintercalation of lithium ions in charge-discharge cycles is released by means of voids (pores). This suppresses the occurrence of cracking in the cathode active material associated with repeated charge-discharge cycles to a minimum possible extent. The bonding strength between the cathode active material and, for example, a binder is enhanced by virtue of the presence of open pores. Thus, separation is suppressed at the bonding interface between the cathode active material and, for example, a binder to a minimum possible extent. Therefore, there is suppressed, to a minimum possible extent, reduction of capacity or deterioration of cycle characteristic, which would otherwise be caused by generation of an electrically isolated portion (i.e., a portion which does not contribute to capacity) through breakage of an electrical conduction path in the cathode active material due to the occurrence of cracking or separation at the bonding interface.

The cathode active material of the present invention contains therein an open pore having a protrusion as described above, and the inner surface of the open pore or the surface of the protrusion formed on the pore effectively functions as a surface for intercalation and deintercalation of lithium ions. Therefore, the cathode active material exhibits more favorable rate characteristic, as compared with the case of a cathode active material containing closed pores or open pores having no protrusions.

For example, lithium cobaltate expands its volume upon charge (i.e., deintercalation of lithium ions), whereas lithium nickelate expands its volume upon discharge (i.e., intercalation of lithium ions). Therefore, volume expansion/contraction upon charge-discharge cycles can be apparently reduced to zero by appropriately adjusting the compositional proportion of cobalt or nickel. However, even in this case, lattice length changes. Specifically, $Li(Co_{0.5}Ni_{0.5})O_2$ expands in a c-axis direction and contracts in an a-axis direction.

Therefore, the present invention is very effectively applied to the case of the following composition: a lithium composite oxide having a layered rock salt structure (e.g., lithium cobaltate $Li_pCoO_2$ [wherein $1 \le p \le 1.1$], lithium nickelate $LiNiO_2$, lithium-rich layered lithium manganate $Li_2MnO_3$, layered lithium nickel manganate $Li_p(Ni_{0.5}, Mn_{0.5})O_2$, a solid solution thereof represented by the formula $Li_p(Co_x, Ni_x, Mn_z)O_2$ [wherein $0.97 \leq p \leq 1.07$, $x+y+z=1$], $Li_p(Co_x, Ni_y, Al_z)O_2$ [wherein $0.97 \leq p \leq 1.07$, $x+y+z=1$, $0<x \leq 0.25$, $0.6 \leq y \leq 0.9$, $0<z \leq 0.1$], or a solid solution of $Li_2MnO_3$ and $LiMO_2$ (M is a transition metal such as Co or Ni)); or a lithium composite oxide having a spinel structure (e.g., lithium manganate $LiMn_2O_4$ or lithium nickel manganate $LiNi_{0.25}Mn_{0.75}O_4$). The cathode active material of the present invention may contain one or more elements selected from among, for example, Mg, Al, Si, Ca, Ti, V, Cr, Fe, Cu, Zn, Ga, Ge, Sr, Y, Zr, Nb, Mo, Ag, Sn, Sb, Te, Ba, and Bi, so long as any of the aforementioned formulas is satisfied.

The present invention is particularly effectively applied to the case of a composition exhibiting increased volume expansion/contraction; for example, $Li_p(Co_x, Ni_y, Mn_z)O_2$ wherein the proportion by mole of nickel is 0.75 or more or the proportion by mole of cobalt is 0.9 or more, or $Li_p(Co_x, Ni_y, Al_z)O_2$ wherein the proportion by mole of nickel is 0.7 or more.

DETAILED DESCRIPTION OF THE INVENTION

Preferred embodiments of the present invention will next be described with reference to examples and comparative examples. The following description of the embodiments is nothing more than the specific description of mere example embodiments of the present invention to the possible extent in order to fulfill description requirements (descriptive requirement and enabling requirement) of specifications required by law.

Thus, as will be described later, naturally, the present invention is not limited to the specific configurations of embodiments and examples to be described below. Modifications that can be made to the embodiments and examples are collectively described herein principally at the end, since insertion thereof into the description of the embodiments would disturb understanding of consistent description of the embodiments.

<Configuration of Lithium Secondary Battery 1: Liquid Type>

Figure 1A:
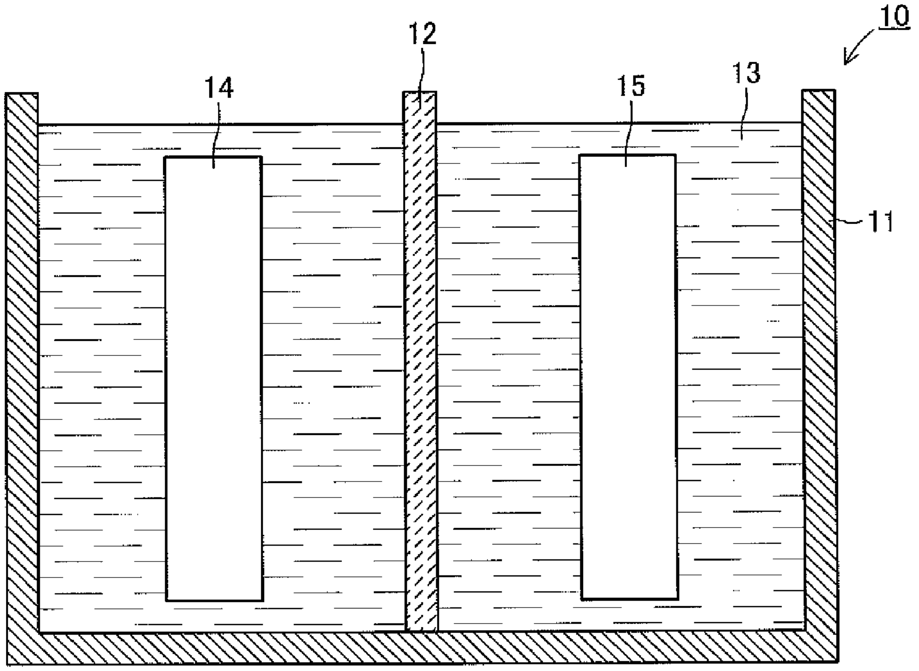
FIG. 1A is a sectional view of the schematic configuration of an exemplary lithium secondary battery to which the present invention is applied.

FIG. 1A is a sectional view of the schematic configuration of an example lithium secondary battery to which the present invention is applied. Referring to FIG. 1A, a lithium secondary battery 10 is of a so-called liquid type and has a cell casing 11, a separator 12, an electrolyte 13, an anode 14, and a cathode 15.

The separator 12 is provided so as to halve the interior of the cell casing 11. The cell casing 11 accommodates the liquid electrolyte 13. The anode 14 and the cathode 15 are provided within the cell casing 11 in such a manner as to face each other with the separator 12 located therebetween.

The electrolyte 13 is preferably, for example, a nonaqueous-solvent-based electrolytic solution prepared by dissolving an electrolyte salt, such as a lithium salt, in a nonaqueous solvent such as an organic solvent, from the viewpoint of electrical characteristics and easy handlability. The electrolyte 13 may be a polymer electrolyte, a gel electrolyte, an organic solid electrolyte, or an inorganic solid electrolyte. No problem arises when such an electrolyte is employed.

No particular limitation is imposed on the solvent for the nonaqueous electrolytic solution. Examples of the solvent include chain esters, such as dimethyl carbonate, diethyl carbonate, ethyl methyl carbonate, and methyl propione carbonate; cyclic esters having high dielectric constant, such as ethylene carbonate, propylene carbonate, butylene carbonate, and vinylene carbonate; and mixed solvents of a chain ester and a cyclic ester. Among them, a mixed solvent containing a chain ester serving as a main solvent with a cyclic ester is particularly preferred.

In preparation of a nonaqueous electrolytic solution, examples of the electrolyte salt to be dissolved in the above-mentioned solvent include $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(RfSO_2)(Rf'SO_2)$, $LiC(RfSO_2)_3$, $LiC_nF_{2n+1}SO_3$ ($n \geq 2$), and $LiN(RfOSO_2)_2$ [Rf and Rf' each represent a fluoroalkyl group]. They may be used singly or in combination of two or more species. Among the above-mentioned electrolyte salts, a fluorine-containing organic lithium salt having a carbon number of 2 or greater is particularly preferred. This is because the fluorine-containing organic lithium salt is high in anionic property and readily undergoes electrolytic dissociation, and is thus readily dissolvable in the above-mentioned solvent. No particular limitation is imposed on the electrolyte salt concentration of the nonaqueous electrolytic solution. However, for example, the concentration is 0.3 mol/L to 1.7 mol/L, more preferably 0.4 mol/L to 1.5 mol/L.

Any anode active material may be used in the anode 14, so long as the material can occlude and release lithium ions. For example, there are used carbonaceous materials, such as graphite, pyrolytic carbon, coke, glassy carbon, a fired product of organic polymer compound, mesocarbon microbeads, carbon fiber, and activated carbon. Also, there may be used, as the anode active material, an alloy which contains metallic lithium, silicon, tin, indium, or the like; an oxide of silicon, tin, or the like which can perform charge and discharge at low electric potential near that at which lithium does; and a lithium-occluding material, such as a nitride of lithium and cobalt such as $Li_{2.6}Co_{0.4}N$. Further, a portion of graphite may be replaced with a metal which can be alloyed with lithium, or with an oxide. When graphite is used as the anode active material, the voltage at full charge can be considered to be about 0.1 V (vs. lithium); thus, the electric potential of the cathode 15 can be conveniently calculated as a cell voltage plus 0.1 V. Therefore, since the electric potential of the cathode 15 at charging is readily controlled, graphite is preferred.

Figure 1B:
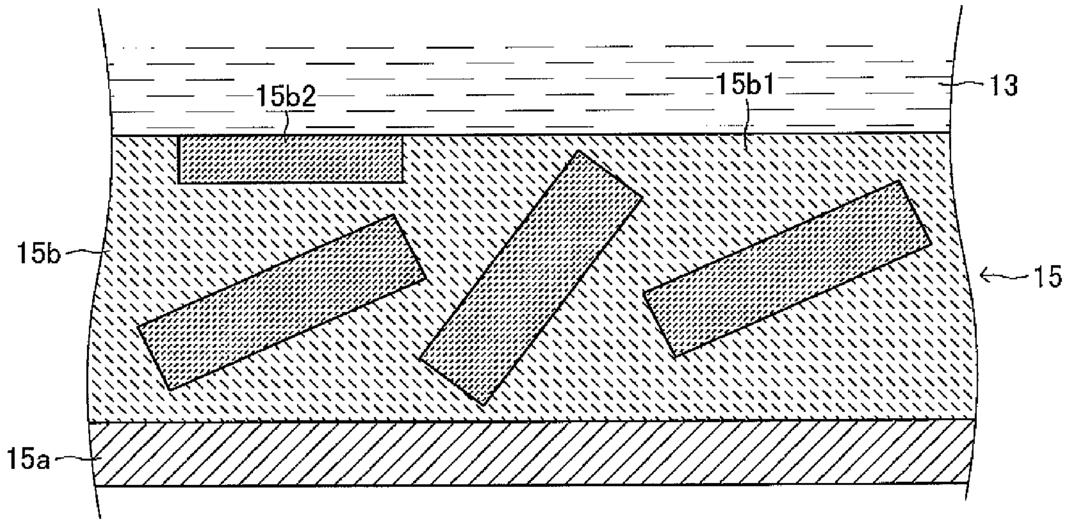
FIG. 1B is an enlarged sectional view of the cathode shown in FIG. 1A.

FIG. 1B is an enlarged sectional view of the cathode 15 shown in FIG. 1A. Referring to FIG. 1B, the cathode 15 includes a cathode collector 15*a* and a cathode active material layer 15*b*. The cathode active material layer 15*b* is composed of a binder 15*b*1 and cathode active material plate-like particles 15*b*2. The cathode active material plate-like particles 15*b*2 are formed so as to have a thickness of 5 μm or more and less than 200 μm, and are uniformly dispersed in the binder 15*b*1.

Since the basic configurations of the lithium secondary battery 10 and the cathode 15 (including materials used to form the cell casing 11, the separator 12, the electrolyte 13, the anode 14, the cathode collector 15*a*, and the binder 15*b*1) shown in FIGS. 1A and 1B are well known, detailed description thereof is omitted herein.

<Configuration of Lithium Secondary Battery 2: Full-Solid Type>

Figure 2A:
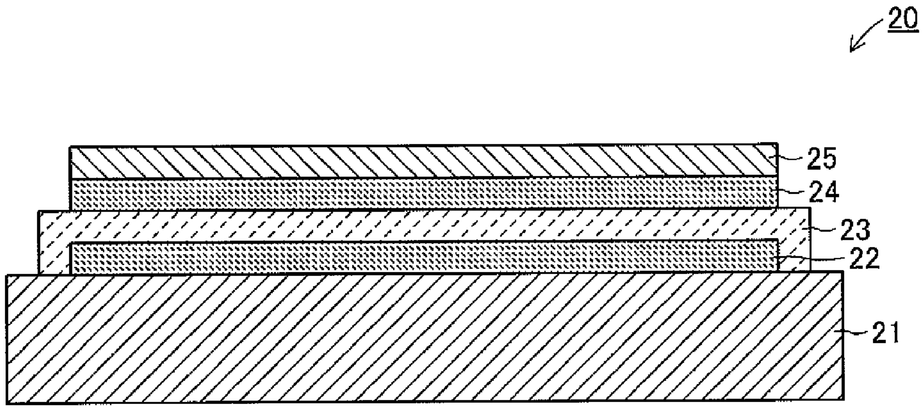
FIG. 2A is a sectional view of the schematic configuration of another exemplary lithium secondary battery to which the present invention is applied.

FIG. 2A is a sectional view of the schematic configuration of another exemplary lithium secondary battery to which the present invention is applied. Referring to FIG. 2A, a lithium secondary battery 20 is of a so-called full-solid type and has a cathode collector 21, a cathode active material layer 22, a solid electrolyte layer 23, an anode active material layer 24, and an anode collector 25. The lithium secondary battery 20 is formed by sequentially stacking the cathode active material layer 22, the solid electrolyte layer 23, the anode active material layer 24, and the anode collector 25 on the cathode collector 21.

Since the basic configurations of the lithium secondary battery 20 (including materials used to form the cathode collector 21, the solid electrolyte layer 23, the anode active material layer 24, and the anode collector 25) shown in FIG. 2A are well known, detailed description thereof is omitted herein.

Figure 2B:
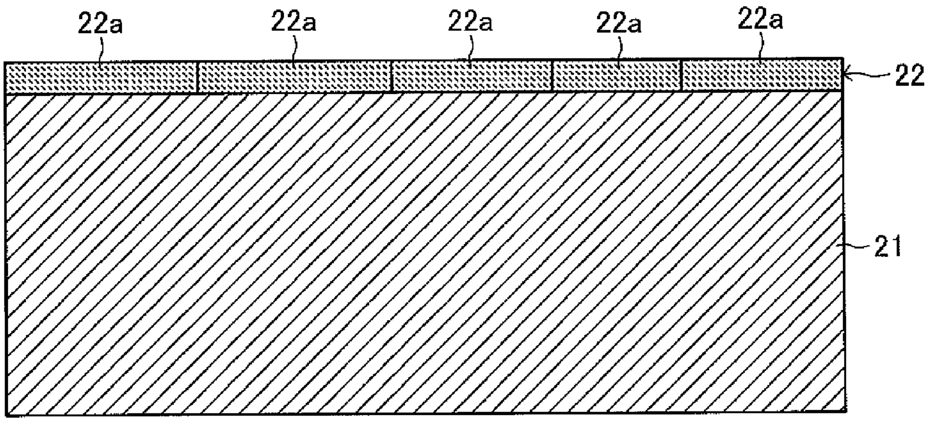
FIG. 2B is an enlarged sectional view of the cathode active material layer shown in FIG. 2A.

FIG. 2B is an enlarged sectional view of the cathode active material layer 22 shown in FIG. 2A. Referring to FIG. 2B, the cathode active material layer 22 is formed such that a large number of plate-like small particles (or crystallites) 22*a* are arranged on the plate surface to form a film. The plate-like small particles 22*a* are formed so as to have a thickness of 5 μm or more and less than 200 μm.

<Configuration of Lithium Secondary Battery 3: Polymer Type>

Figure 3:
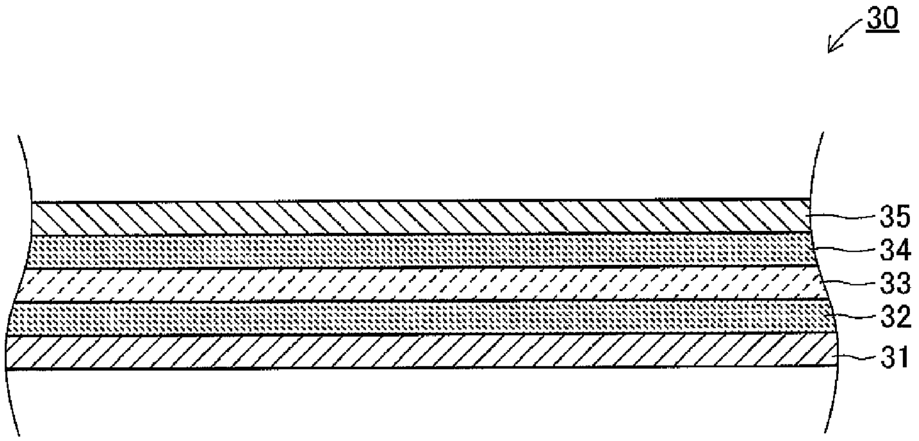
FIG. 3 is a sectional view of the schematic configuration of yet another exemplary lithium secondary battery to which the present invention is applied.

FIG. 3 is a sectional view of the schematic configuration of a lithium secondary battery 30 according to yet another embodiment of the present invention. Referring to FIG. 3, the lithium secondary battery 30 is of a so-called polymer type and has a cathode collector 31, a cathode active material layer 32, a polymer electrolyte layer 33, an anode active material layer 34, and an anode collector 35.

The lithium secondary battery 30 is formed by sequentially stacking the cathode active material layer 32, the polymer electrolyte layer 33, the anode active material layer 34, and the anode collector 35 on the cathode collector 31. The cathode active material layer 32 is formed so as to have a thickness of 5 μm or more and less than 200 μm.

<Internal Structure of Cathode Active Material>

Figure 4A:
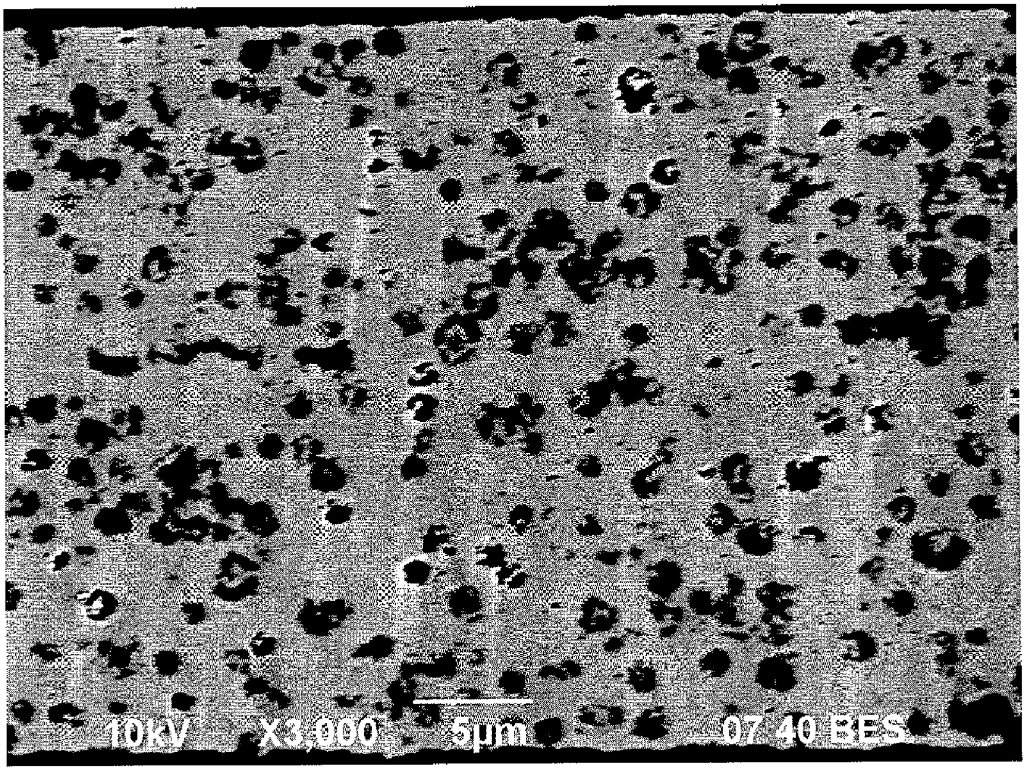
FIG. 4A is a scanning electron micrograph of a cross section of a self-standing film of a lithium composite oxide forming cathode active material plate-like particles, or a cathode active material layer, each of which is an embodiment of the present invention.

FIG. 4A is a scanning electron micrograph of a cross section of a self-standing film of a lithium composite oxide forming the cathode active material plate-like particles 15*b*2, the cathode active material layer 22 (plate-like small particles 22*a*), or the cathode active material layer 32, each of which is an embodiment of the present invention.

As shown in FIG. 4A, the cathode active material plate-like particles 15*b*2, the cathode active material layer 22 (plate-like small particles 22*a*), or the cathode active material layer 32, each of which is an embodiment of the present invention, is composed of a lithium composite oxide having a layered rock salt structure, and is formed so as to have a voidage of 3 to 30% and an open pore ratio of 70% or more. in each open pore formed in the cathode active material plate-like particles 15*b*2, the cathode active material layer 22 (plate-like small particles 22*a*), or the cathode active material layer 32, a protrusion is formed so as to extend from the inner surface of the open pore toward the center of the open pore.

Figure 4B:
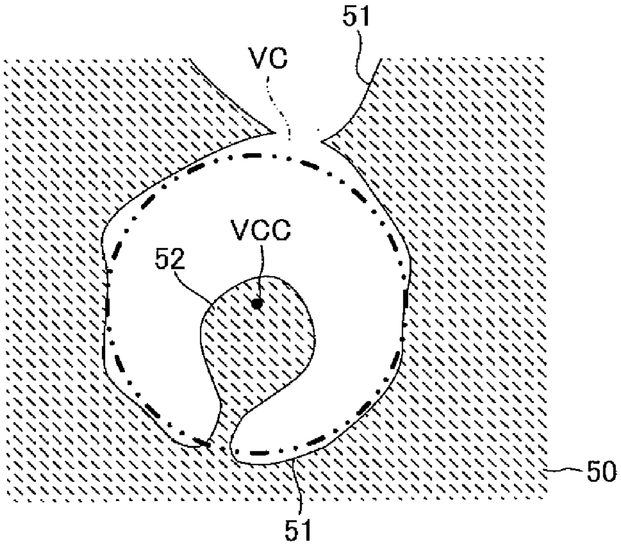
FIG. 4B is a schematic representation of one of pores (open pores) shown in FIG. 4A.

FIG. 4B is a schematic representation of one of pores (open pores) shown in FIG. 4A. As shown in FIGS. 4A and 4B, a cathode active material matrix 50 contains numerous open pores 51 therein. In each open pore 51, a protrusion 52 is formed so as to extend from the inner surface of the open pore 51 toward the center VCC of a virtual circle (VC) formed by approximating the shape of a cross section of the open pore 51 to a circular shape (in this case, the virtual circle is an inscribed circle). The protrusion 52 may be porous, or may be formed in a ring shape. Alternatively, the protrusion 52 may be in a state where it is not in contact with the open pore as viewed in a cross section (i.e., in a floating state). The protrusion 52 is formed of the same material as the matrix 50.

All the open pores contained in the cathode active material plate-like particles 15*b*2, the cathode active material layer 22 (plate-like small particles 22*a*), or the cathode active material layer 32 do not necessarily have a shape as shown in FIG. 4B. However, preferably, the amount of open pores having such a shape as shown in FIG. 4B is large (5% or more).

<Summary of Method for Producing Cathode Active Material>

The cathode active material having the aforementioned structure is readily and reliably formed through, for example, the following production method.

1. Raw Material

Particles of a transition metal (e.g., Co, Ni, or Mn) compound containing no lithium compound are employed as raw material particles. The raw material particles may be appropriately pulverized and classified. In consideration of a composition of interest, a plurality of types of raw material particles may be appropriately mixed together. The raw material particles may be mixed with a low-melting-point oxide (e.g., boron oxide, bismuth oxide, or antimony oxide), a low-melting-point chloride (e.g., sodium chloride or potassium chloride), or a low-melting-point glass material (e.g., borosilicate glass) in an amount of 0.001 to 30 wt. % for the purpose of promoting grain growth.

The raw material particle mixture may be uniformly mixed with an additive for forming voids (pores); i.e., a void-forming material (in a particulate or fibrous form). Such a void-forming material may be a substance which decomposes in the subsequent calcination step; for example, an organic synthetic resin. Specific examples of preferred void-forming materials include organic synthetic resins (polymers) which are sufficiently softened at a temperature in the vicinity of, or lower than the temperature at which combustion, evaporation, or thermal decomposition starts (i.e., the temperature at which weight change occurs in thermogravimetric analysis); for example, phenolic resin, nylon resin, and polyethylene terephthalate resin. The void-forming material may be, for example, an organic synthetic resin in which raw material particles are dispersed, active material particles coated with an organic synthetic resin, or a porous active material.

In the case where the aforementioned softening resin is employed as a void-forming material, when the subsequent calcination step is carried out at a temperature at which the void-forming material is sufficiently softened upon decomposition (specifically, the temperature elevation rate is appropriately determined, or the calcination temperature is maintained at a specific temperature), there can be formed open pores each having a pseudo-circular cross section and containing the aforementioned protrusion therein. Although the reason for this has not yet been fully elucidated, it is considered as follows.

When the void-forming material is sufficiently softened upon decomposition, the softened void-forming material incorporates therein raw material powder present around the material by means of surface tension. When the void-forming material disappears through decomposition, the raw material powder particles incorporated in the void-forming material aggregate together, and the resultant aggregates are fused to the inner surfaces (inner walls) of voids (pores) in the calcination step or the subsequent lithium incorporation step, to thereby form protrusions in the voids (pores).

2. Forming Step

Raw material particles or a mixture thereof is subjected to a sheet forming step, to thereby form an "independent" sheet-like compact. As used herein, "independent" sheet (may be referred to as "self-standing film") refers to a sheet which is independent of another support and can be handled by itself. Therefore, "independent" sheet does not include a sheet bonded to and integrated with another support (e.g., substrate) (i.e., impossible or difficult to separate from the support).

Sheet forming may be carried out through any well known technique. Specifically, sheet forming may be performed by means of, for example, a doctor blade-type sheet forming machine (doctor blade method), a drum dryer, a disk dryer, or a screen printing machine. The thickness of a sheet-like compact is appropriately determined so as to attain the aforementioned preferred thickness after firing.

3. Compact Calcination Step

The sheet-like compact formed through the aforementioned forming step is fired at a relatively low temperature (e.g., 700 to 1,200° C.) before the below-described lithium incorporation step. This calcination step removes organic substances and forms a porous sheet-like intermediate fired compact containing numerous pores of relatively large size. This calcination step is carried out in air in a state where, for example, the above-formed sheet-like compact is placed on a zirconia-made embossed setter.

4. Lithium Incorporation Step

A lithium compound is applied to the intermediate fired compact obtained through the aforementioned calcination step, followed by thermal treatment, whereby lithium is incorporated into the intermediate fired compact. Thus, there is produced an "independent" sheet-like sintered compact (film) of lithium composite oxide for a cathode active material layer. The lithium incorporation step is carried out in, for example, a crucible.

Examples of the employable lithium compound include lithium salts such as lithium carbonate, lithium nitrate, lithium acetate, lithium peroxide, lithium hydroxide, lithium chloride, lithium oxalate, and lithium citrate; and lithium alkoxides such as lithium methoxide and lithium ethoxide. The lithium compound is added so that, in the sheet-like sintered compact represented by the formula $Li_xMO_2$, the ratio by mole of lithium to M (i.e., Li/M) is 1 or more.

5. Crushing Step

For production of cathode active material particles, the above-obtained sheet-like compact is crushed into numerous particles before or after the aforementioned lithium incorporation step. This crushing step may be carried out through any crushing or pulverization means such as a ball mill. Alternatively, the crushing step may be performed by placing the above-obtained sheet-like compact onto a mesh having a specific opening size, and pressing the compact against the mesh with a spatula. In the case of production of a cathode active material film, the crushing step is omitted.

SPECIFIC EXAMPLES

Next will be described in detail specific examples of cathode active material plate-like particles and cathode active material films, and the results of evaluation of the particles and films of the specific examples.

Specific Example 1

Cathode Active Material Film, Nickel-Based Composition (1) Preparation of Slurry NiO powder (particle size: 1 to 10 μm; product of Seido Kagaku Kogyo Co., Ltd.) (75.1 parts by weight), $Co_3O_4$ powder (particle size: 1 to 5 μm; product of Seido Kagaku Kogyo Co., Ltd.) (21.5 parts by weight), and $Al_2O_3$ powder (particle size: 1 to 10 μm; product of Showa Denko K.K.) (3.4 parts by weight) were mixed together and pulverized, and the resultant mixture was thermally treated in air at 1,000° C. for five hours, to thereby synthesize $(Ni_{0.75}, Co_{0.2}, Al_{0.05})O$ powder.

The thus-synthesized powder was pulverized by means of a pot mill, and the resultant $(Ni_{0.75}, Co_{0.2}, Al_{0.05})O$ raw material particles (100 parts by weight) were mixed with a dispersion medium (xylene:butanol=1:1) (100 parts by weight), a binder (polyvinyl butyral: product No. "BM-2," product of Sekisui Chemical Co. Ltd.) (10 parts by weight), a plasticizer (DOP: di(2-ethylhexyl) phthalate, product of Kurogane Kasei Co., Ltd.) (4 parts by weight), a dispersant (trade name "RHEODOL SP-030," product of Kao Corporation) (2 parts by weight), and a void-forming material (Bellpearl R100, product of Air Water Inc.) (14 parts by weight). The resultant mixture was stirred under reduced pressure for defoaming, and the viscosity thereof was adjusted to 3,000 to 4,000 cP.

(2) Sheet Forming

The thus-prepared slurry was formed into a sheet-like compact on a PET film through the doctor blade method so that the thickness of the compact as measured after drying was adjusted to 50 μm.

(3) Calcination

The sheet-like compact was removed from the PET film and was cut into square pieces (50 mm×50 mm) by means of a cutter. Each piece was placed at the center of the aforementioned zirconia-made setter. The piece was heated in air at a specific temperature elevation rate (described below in Table 1), and fired at 900° C. for 10 hours. Thereafter, the atmosphere in the firing furnace was replaced with an oxygen atmosphere, followed by cooling to room temperature at 200 degrees (° C.)/h. Then, a portion of the piece which was not fused to the setter was removed from the furnace.

(4) Lithium Incorporation

LiOH powder (product of Kanto Chemical Co., Inc.) was applied to the thus-obtained $(Ni_{0.75}, Co_{0.2}, Al_{0.05})O$ ceramic sheet so that the ratio by mole of Li/(NiCoAl) was 2.0, and the mixture was thermally treated in an oxygen atmosphere (0.1 MPa) at 775° C. for 48 hours, to thereby produce an "independent" sheet-like $Li_{1.0}(Ni_{0.75}, Co_{0.2}, Al_{0.05})O_2$ ceramic cathode active material layer.

Specific Example 2

Cathode Active Material Plate-Like Particles, Nickel-Based Composition (1) Preparation of Slurry NiO powder (particle size: 1 to 10 μm; product of Seido Kagaku Kogyo Co., Ltd.) (75.1 parts by weight), $Co_3O_4$ powder (particle size: 1 to 5 μm; product of Seido Kagaku Kogyo Co., Ltd.) (21.5 parts by weight), and $Al_2O_3$ powder (particle size: 1 to 10 μm; product of Showa Denko K.K.) (3.4 parts by weight) were mixed together and pulverized, and the resultant mixture was thermally treated in air at 1,000° C. for five hours, to thereby synthesize $(Ni_{0.75}Co_{0.2}Al_{0.05})O$ powder.

The thus-synthesized powder was pulverized by means of a pot mill, and the resultant $(Ni_{0.75}, Co_{0.2}, Al_{0.05})O$ raw material particles (100 parts by weight) were mixed with a dispersion medium (xylene:butanol=1:1) (100 parts by weight), a binder (polyvinyl butyral: product No. "BM-2," product of Sekisui Chemical Co. Ltd.) (10 parts by weight), a plasticizer (DOP: di(2-ethylhexyl) phthalate, product of Kurogane Kasei Co., Ltd.) (4 parts by weight), a dispersant (trade name "RHEODOL SP-O30," product of Kao Corporation) (2 parts by weight), and a void-forming material (Bellpearl R100, product of Air Water Inc.) (14 parts by weight). The resultant mixture was stirred under reduced pressure for defoaming, and the viscosity thereof was adjusted to 3,000 to 4,000 cP.

(2) Sheet Forming

The thus-prepared slurry was formed into a sheet-like compact on a PET film through the doctor blade method so that the thickness of the compact as measured after drying was adjusted to 10 μm.

(3) Calcination

The sheet-like compact was removed from the PET film, and the compact (20 g) was crumpled into an alumina-made sheath (size: 150 mm×150 mm, height: 10 mm). The compact was heated in air at a specific temperature elevation rate (described below in Table 2), and fired at 900° C. for three hours, followed by cooling to room temperature at 200 degrees (° C.)/h. Then, a portion of the compact which was not fused to the setter was removed from the sheath.

(4) Pulverization

The thus-removed fired compact (50 g), nylon balls (diameter: 10 mm) (370 g), and ethanol (165 g) were placed in a polypropylene-made pot (volume: 1 L) and mixed for 20 hours for pulverization.

(5) Lithium Incorporation

The thus-obtained $(Ni_{0.75}, Co_{0.2}, Al_{0.05})O$ powder was mixed with $Li_2CO_3$ powder (product of Kanto Chemical Co., Inc.) so that Li/Co was 1.1, and the mixture was thermally treated in an oxygen atmosphere (0.1 MPa) at 825° C. for 24 hours, to thereby produce plate-like $Li_{1.0}(Ni_{0.75}Co_{0.2}Al_{0.05})O_2$ powder particles having a thickness of 10 μm.

Specific Example 3

Cathode Active Material Film, Ternary Composition (1) Preparation of Slurry

NiO powder (particle size: 1 to 10 μm; product of Seido Kagaku Kogyo Co., Ltd.), $MnCO_3$ powder (particle size: 1 to 10 μm; product of Tosoh Corporation), and $Co_3O_4$ powder (particle size: 1 to 5 μm; product of Seido Kagaku Kogyo Co., Ltd.) were mixed so as to attain a composition of $(Ni_{1/3}Mn_{1/3}Co_{1/3})O$. The resultant mixture was pulverized and thermally treated in a hermetically sealed sheath filled with air at 720° C. for 24 hours, to thereby synthesize $(Ni_{1/3}Mn_{1/3}Co_{1/3})O$ powder.

The thus-synthesized powder was pulverized by means of a pot mill for five hours, and the resultant $(Ni_{1/3}Mn_{1/3}Co_{1/3})O$ raw material particles (particle size: 0.3 μm) (100 parts by weight) were mixed with a dispersion medium (xylene:butanol=1:1) (100 parts by weight), a binder (polyvinyl butyral: product No. BM-2, product of Sekisui Chemical Co. Ltd.) (10 parts by weight), a plasticizer (DOP: di(2-ethylhexyl) phthalate, product of Kurogane Kasei Co., Ltd.) (4 parts by weight), a dispersant (trade name: RHEODOL SP-030, product of Kao Corporation) (2 parts by weight), and a void-forming material (Bellpearl R100, product of Air Water Inc.) (14 parts by weight). The resultant mixture was stirred under reduced pressure for defoaming, and the viscosity thereof was adjusted to 3,000 to 4,000 cP.

(2) Sheet Forming

The thus-prepared slurry was formed into a sheet-like compact on a PET film through the doctor blade method so that the thickness of the compact as measured after drying was adjusted to 50 μm.

(3) Calcination

The sheet-like compact was removed from the PET film and was cut into square pieces (50 mm×50 mm) by means of a cutter. Each piece was placed at the center of the aforementioned zirconia-made setter. The piece was heated in air at a specific temperature elevation rate (described below in Table 3), and fired at 1,000° C. for five hours, followed by cooling to room temperature at 200 degrees (° C.)/h. Then, a portion of the piece which was not fused to the setter was taken out.

(4) Lithium Incorporation

LiOH powder (product of Kanto Chemical Co., Inc.) was applied to the thus-obtained $(Ni_{1/3}Mn_{1/3}Co_{1/3})_3O_4$ ceramic sheet so that the ratio by mole of Li/(Ni+Mn+Co) was 1.1, and the mixture was thermally treated in an oxygen atmosphere (0.1 MPa) at 900° C. for 20 hours, to thereby produce plate-like $Li_{1.0}(Ni_{0.75}Co_{0.2}Al_{0.05})O_2$ powder particles having a Specific Example 4

Cathode Active Material Plate-Like Particles, Ternary Composition (1) Preparation of Slurry NiO powder (particle size: 1 to 10 μm; product of Seido Kagaku Kogyo Co., Ltd.), $MnCO_3$ powder (particle size: 1 to 10 μm; product of Tosoh Corporation), and $Co_3O_4$ powder (particle size: 1 to 5 μm; product of Seido Kagaku Kogyo Co., Ltd.) were mixed so as to attain a composition of $(Ni_{1/3}Mn_{1/3}Co_{1/3})O$. The resultant mixture was pulverized and thermally treated in a hermetically sealed sheath filled with air at 720° C. for 24 hours, to thereby synthesize $(Ni_{1/3}Mn_{1/3}Co_{1/3})O$ powder.

The thus-synthesized powder was pulverized by means of a pot mill for five hours, and the resultant $(Ni_{1/3}Mn_{1/3}Co_{1/3})O$ raw material particles (particle size: 0.3 μm) (100 parts by weight) were mixed with a dispersion medium (xylene:butanol=1:1) (100 parts by weight), a binder (polyvinyl butyral: product No. BM-2, product of Sekisui Chemical Co. Ltd.) (10 parts by weight), a plasticizer (DOP: di(2-ethylhexyl) phthalate, product of Kurogane Kasei Co., Ltd.) (4 parts by weight), a dispersant (trade name: RHEODOL SP-030, product of Kao Corporation) (2 parts by weight), and a void-forming material (Bellpearl 8100, product of Air Water Inc.) (14 parts by weight). The resultant mixture was stirred under reduced pressure for defoaming, and the viscosity thereof was adjusted to 3,000 to 4,000 cP.

(2) Sheet Forming

The thus-prepared slurry was formed into a sheet-like compact on a PET film through the doctor blade method so that the thickness of the compact as measured after drying was adjusted to 10 μm.

(3) Calcination

The sheet-like compact was removed from the PET film, and the compact (20 g) was crumpled into an alumina-made sheath (size: 150 mm×150 mm, height: 10 mm). The compact was heated in air at a specific temperature elevation rate (described below in Table 4), and fired at 1,000° C. for five hours, followed by cooling to room temperature at 200 degrees (° C.)/h. Then, a portion of the compact which was not fused to the setter was removed from the sheath.

(4) Pulverization

The thus-removed fired compact (50 g), nylon balls (diameter: 10 mm) (370 g), and ethanol (165 g) were placed in a polypropylene-made pot (volume: 1 L) and mixed for 20 hours for pulverization.

(5) Lithium Incorporation

The thus-obtained $(Ni_{1/3}Mn_{1/3}Co_{1/3})_3O_4$ powder was mixed with LiOH powder (product of Kanto Chemical Co., Inc.) so that the ratio by mole of Li/(Ni+Mn+Co) was 1.1, and the mixture was thermally treated in an oxygen atmosphere (0.1 MPa) at 900° C. for 20 hours, to thereby produce plate-like $Li_{1.0}(Ni_{0.75}Co_{0.2}Al_{0.05})O_2$ powder particles having a thickness of <<Evaluation Methods>>

For evaluation of cell characteristics attributable to cathode active material plate-like particles, a cell was fabricated in the following manner.

The above-produced plate-like particles, acetylene black, and polyvinylidene fluoride (PTFE) were mixed in proportions by mass of 5:5:1, to thereby prepare a cathode material. The thus-prepared cathode material (0.02 g) was pressed into a disk-like compact having a diameter of 20 mm under a pressure of 300 kg/cm$^2$, to thereby form a cathode.

The thus-formed cathode, an anode formed of a lithium metal plate, stainless steel collector plates, and a separator were arranged in the order of collector plate-cathode-separator-anode-collector plate. The resultant stacked product was filled with an electrolytic solution, to thereby produce a coin cell. The electrolytic solution was prepared by dissolving $LiPF_6$ in an equivolume mixture of ethylene carbonate (EC) and diethyl carbonate (DEC) serving as an organic solvent to a concentration of 1 mol/L.

The thus-fabricated coin cell was evaluated in terms of discharge capacity ratio.

One cycle consists of the following charge and discharge operations: constant-current charge is carried out at 0.1C rate of current until the cell voltage becomes 4.2 V; subsequently, constant-voltage charge is carried out under a current condition of maintaining the cell voltage at 4.2 V, until the current drops to 1/20, followed by 10 minutes rest; and then, constant-current discharge is carried out at 0.1C rate of current until the cell voltage becomes 3.0 V, followed by 10 minutes rest. A total of two cycles were performed under a condition of 25° C., and the discharge capacity in the second cycle was measured. Subsequently, charge and discharge operations were performed in the same manner as described above, except that constant-current discharge is carried out at 1C rate of current. Thus, the discharge capacity at 1C rate of current was measured.

Discharge capacity ratio (%) was defined as a value calculated by dividing the discharge capacity at 1C rate of current by the discharge capacity at 0.1C rate of current.

For evaluation of cell characteristics attributable to cathode active material film (self-standing film), a cell was fabricated in the following manner.

Through sputtering, Au was deposited on one side of a self-standing film having a diameter of about 16 mm so as to form a current collection layer (thickness: 500 Å), to thereby produce a cathode plate. The thus-produced cathode plate, an anode formed of a lithium metal plate, stainless steel collector plates, and a separator were arranged in the order of collector plate-cathode-separator-anode-collector plate. The resultant stacked product was filled with an electrolytic solution in a manner similar to that described above, to thereby fabricate a coin cell.

In the Examples and Comparative Examples, the "amount of pores having protrusions" was determined as follows.

Firstly, each of the samples of Examples and Comparative Examples was placed on a sample-processing plate and subjected to cross-section polishing through argon ion milling by means of a cross section sample preparation device (product of JEOL Ltd.). The cross section of the sample was observed under a scanning electron microscope (product of JEOL Ltd.), and an image was captured at such a magnification that a visual field includes 20 to 40 pores having a pseudo-circular contour (including pores having protrusions therein). In the thus-captured image, an inscribed circle was drawn in each pore having a pseudo-circular contour (in the case of a pore having a protrusion therein, an inscribed circle was drawn so as to exclude the protrusion). The number of pores each having therein a protrusion reaching the center of an inscribed circle of the pore was divided by the number of all the pores having a pseudo-circular contour in the visual field, and the resultant value was regarded as the "amount of pores having protrusions."

<<Evaluation Results>>

Table 1 shows the evaluation results in the aforementioned Specific Example 1. Similarly, Table 2 shows the evaluation results in the aforementioned Specific Example 2; Table 3 shows the evaluation results in the aforementioned Specific Example 3; and Table 4 shows the evaluation results in the aforementioned Specific Example 4.

TABLE 1

| | Voidage (%) | Temperature elevation rate (° C./h) | Amount of pores having protrusions (%) | Discharge capacity ratio (%) |
|---|---|---|---|---|
| Comp. Ex. 1 | 20 | 1000 | 0 | 80 |
| Ex. 1 | 20 | 200 | 8 | 92 |
| Ex. 2 | 20 | 100 | 17 | 94 |
| Ex. 3 | 20 | 20 | 50 | 96 |

TABLE 2

| | Voidage (%) | Temperature elevation rate (° C./h) | Amount of pores having protrusions (%) | Discharge capacity ratio (%) |
|---|---|---|---|---|
| Comp. Ex. 2 | 20 | 1000 | 0 | 89 |
| Ex. 4 | 20 | 200 | 8 | 96 |
| Ex. 5 | 20 | 100 | 19 | 97 |
| Ex. 6 | 20 | 20 | 48 | 98 |

TABLE 3

| | Voidage (%) | Temperature elevation rate (° C./h) | Amount of pores having protrusions (%) | Discharge capacity ratio (%) |
|---|---|---|---|---|
| Comp. Ex. 3 | 20 | 1000 | 0 | 78 |
| Ex. 7 | 20 | 200 | 9 | 91 |
| Ex. 8 | 20 | 100 | 21 | 93 |
| Ex. 9 | 20 | 20 | 53 | 96 |

TABLE 4

| | Voidage (%) | Temperature elevation rate (° C./h) | Amount of pores having protrusions (%) | Discharge capacity ratio (%) |
|---|---|---|---|---|
| Comp. Ex. 4 | 20 | 1000 | 0 | 88 |
| Ex. 10 | 20 | 200 | 8 | 95 |
| Ex. 11 | 20 | 100 | 20 | 97 |
| Ex. 12 | 20 | 20 | 54 | 99 |

As is clear from Tables 1 to 4, in any of the cases of Specific Example 1 (cathode active material film, nickel-based composition), Specific Example 2 (cathode active material plate-like particles, nickel-based composition), Specific Example 3 (cathode active material film, ternary composition), and Specific Example 4 (cathode active material plate-like particles, ternary composition) (i.e., regardless of the composition and form of cathode active material), the rate characteristic is improved through formation of "pores having protrusions," and a more favorable rate characteristic is obtained when the "amount of pores having protrusions" is higher. In addition, the "amount of pores having protrusions" increases as the temperature elevation rate lowers. The discussion of the evaluation results will next be described.

Open pores are formed by contact between adjacent pseudo-spherical pores (having a pseudo-circular shape as viewed in cross section), and an electrolytic solution is sufficiently diffused in particles through the open pores. The greater the size of pseudo-spherical pores, the greater the size of open pores (in particular, the size of a neck portion at which adjacent pores are in contact with each other). In this case, diffusion of the electrolytic solution is promoted, but bulk density is generally reduced.

When pseudo-spherical pores have therein protrusions formed of cathode active material, bulk density can be increased while the effect of promoting diffusion of an electrolytic solution is maintained. Also, intercalation and deintercalation of lithium ions are promoted by virtue of an increase in surface area of cathode active material in open pores. That is, pore size and specific surface area can be substantially increased without excessively increasing voidage. Therefore, high electron conductivity is maintained. Thus, the present invention realizes production of cathode active material particles and film exhibiting a favorable capacity and rate characteristic.

<Examples of Modifications>

The above-described embodiment and specific examples are, as mentioned above, mere examples of the best mode of the present invention which the applicant of the present invention contemplated at the time of filing the present application. The above-described embodiment and specific examples should not be construed as limiting the invention. Various modifications to the above-described embodiment and specific examples are possible, so long as the invention is not modified in essence.

Several modifications will next be exemplified. In the following description of the modifications, component members similar in structure and function to those of the above-described embodiment are denoted by names and reference numerals similar to those of the above-described embodiment. The description of the component members appearing in the above description of the embodiment can be applied as appropriate, so long as no inconsistencies are involved.

Needless to say, even modifications are not limited to those described below. Limitingly construing the present invention based on the above-described embodiment and the following modifications impairs the interests of an applicant (particularly, an applicant who is motivated to file as quickly as possible under the first-to-file system) while unfairly benefiting imitators, and is thus impermissible.

The structure of the above-described embodiment and the structures of the modifications to be described below are entirely or partially applicable in appropriate combination, so long as no technical inconsistencies are involved.

The present invention is not limited to the constitution which is specifically disclosed in the description of the above embodiments. For example, the cathode collector 15*a* of the cathode 15 may be omitted. Cathode active material particles are not necessarily in a plate-like form.

In the sheet-like sintered compact represented by the formula $Li_xMO_2$, the ratio by mole of lithium to M; i.e., Li/M (Li/Co or Li/(Co, Ni, Mn)) is not limited to 1. The Li/M ratio is preferably 0.9 to 1.2, more preferably 1.0 to 1.1. This Li/M ratio realizes favorable charge-discharge capacity.

Figure 5A:
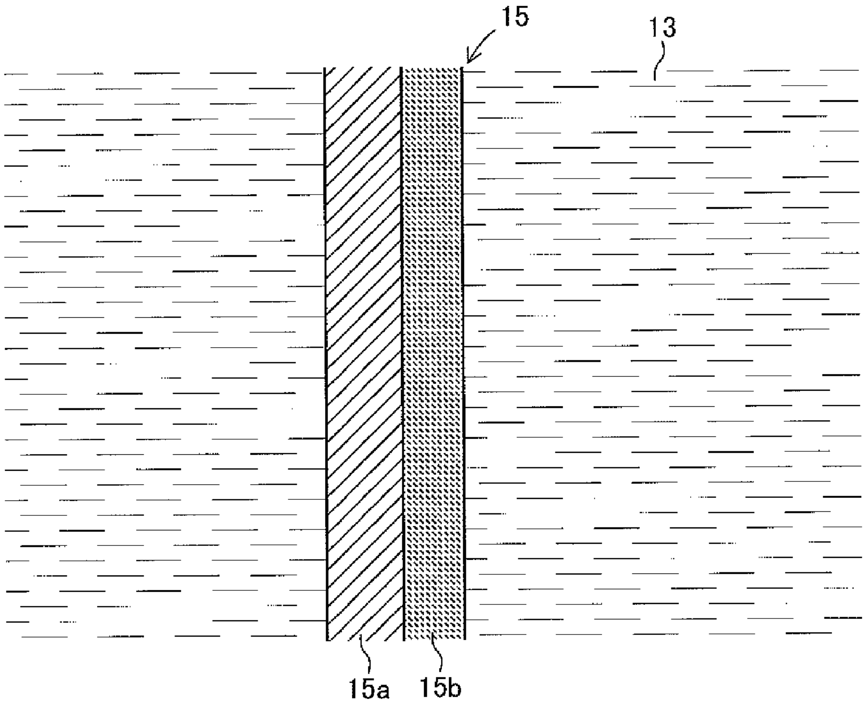
FIG. 5A is a sectional view of the configuration of a modification of the cathode shown in FIG. 1B.
Figure 5B:
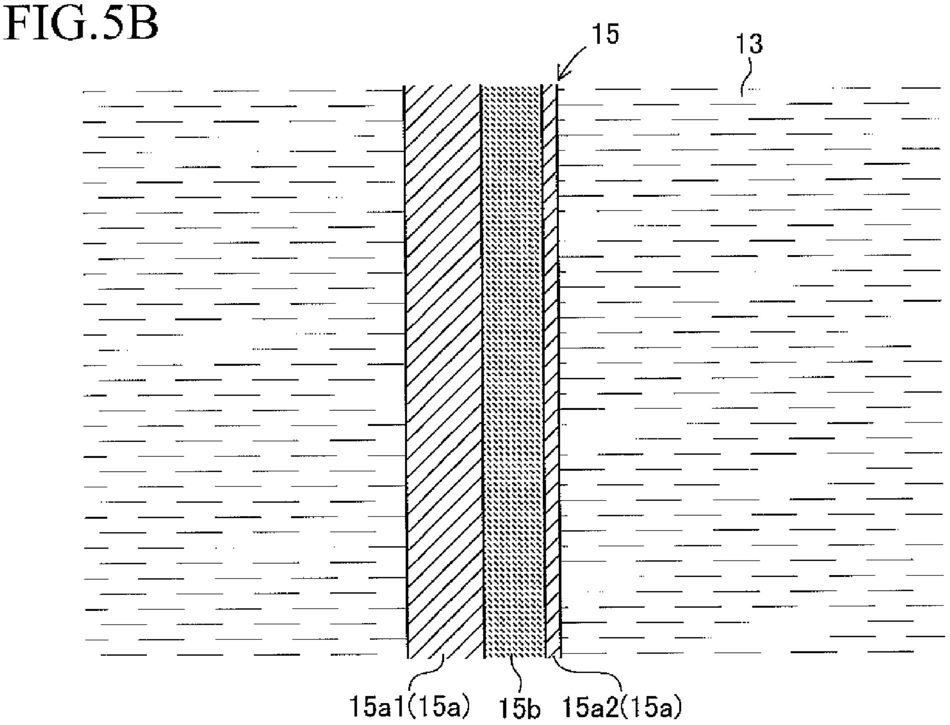
FIG. 5B is a sectional view of the configuration of a modification of the cathode shown in FIG. 1B.

As described above, in the case where the cathode active material layer 15*b* is a self-standing ceramic sheet (cathode active material film), the cathode collector 15*a* may be provided on one plate surface of the cathode active material layer 15*b* (see FIG. 5A), or on each of the plate surfaces of the cathode active material layer 15*b* (see FIG. 5B).

As shown in FIG. 5B, when the cathode collector 15*a* is provided on each of the plate surfaces of the cathode active material layer 15*b*, one cathode collector 15*a*1 may have a thickness greater than that of the other cathode collector 15*a*2 so as to sustain the self-standing cathode active material layer 15*b*. In this case, the counter cathode collector 15*a*2 is formed so as to have such a structure that intercalation/deintercalation of lithium ions through the self-standing cathode active material layer 15*b* is not inhibited (e.g., mesh-shape or porous). Notably, the cathode collector 15*a*2 may be also applied to the cathode 15 shown in FIG. 1B.

As shown in FIG. 5A, when the cathode collector 15*a* is provided on one plate surface of the cathode active material layer 15*b*, the direction of transfer of lithium ions is reverse to that of electrons in the cell reaction at the cathode 15 during charging/discharging, whereby the electric potential slope is generated in the cathode active material layer 15*b*. As the electric potential slope increases, lithium ions are less likely to be diffused.

In contrast, as shown in FIG. 5B, through the provision of the cathode collector 15*a*2, which does not inhibit intercalation/deintercalation of lithium ions, on the surface of the self-standing cathode active material layer 15*b* in contact with the electrolyte layer 13, the aforementioned generation of the electric potential slope is prevented. Thus, cell performance is enhanced.

The present invention is not limited to the above-described specific production method. For example, pulverization (crushing) may be carried out after lithium incorporation as described above. Alternatively, pulverization may be carried out by means of, for example, a mesh. Even in the case where the calcination step is carried out at a high temperature elevation rate (e.g., 1,000 degrees (° C.)/h) as described above, when the calcination temperature is maintained at a specific temperature (e.g., about 400° C.) for a specific period of time during temperature elevation, "pores having protrusions" can be effectively formed.

Needless to say, those modifications which are not particularly referred to are also encompassed in the technical scope of the present invention, so long as the invention is not modified in essence.

Those components which partially constitute means for solving the problems to be solved by the present invention and are illustrated with respect to operations and functions encompass not only the specific structures disclosed above in the description of the above embodiment and modifications but also any other structures that can implement the operations and functions. Further, the contents (including specifications and drawings) of the prior application and publications cited herein can be incorporated herein as appropriate by reference.

What is claimed is:

1. A cathode active material for a lithium secondary battery, characterized by containing therein an open pore having a protrusion which is formed so as to extend from the inner surface of the open pore toward the center of the open pore.

2. A cathode active material for a lithium secondary battery according to claim 1, wherein the protrusion is formed of the same material as the remaining portion of the cathode active material.

3. A cathode active material for a lithium secondary battery according to claim 1, wherein the protrusion is formed so as to extend from the inner surface of the open pore toward the center of a virtual circle formed by approximating the shape of a cross section of the open pore to a circular shape.

4. A cathode active material for a lithium secondary battery according to claim 3, wherein the protrusion is formed of the same material as the remaining portion of the cathode active material.

* * * * *

UNITED STATES PATENT AND TRADEMARK OFFICE

CERTIFICATE OF CORRECTION

PATENT NO. : 8,821,765 B2
APPLICATION NO. : 13/198366
DATED : September 2, 2014
INVENTOR(S) : Ryuta Sugiura et al.

It is certified that error appears in the above-identified patent and that said Letters Patent is hereby corrected as shown below:

Title Page, Item (56) References Cited

U.S. Patent Documents, line 1,

Please replace: “5,631,400 A 5/1997 Beshouri et al.” with -- 5,631,100 A 5/1997 Yoshino et al. --

Signed and Sealed this
Eighteenth Day of November, 2014

Michelle K. Lee
*Deputy Director of the United States Patent and Trademark Office*